Feb. 23, 1937.  D. W. LLOYD  2,071,752
SAFETY CAR EQUIPMENT
Filed Jan. 9, 1936  2 Sheets-Sheet 1

Fig.1
Fig.2

INVENTOR
DAVID W. LLOYD
BY Wm. M. Cady
ATTORNEY

Patented Feb. 23, 1937

2,071,752

UNITED STATES PATENT OFFICE 2,071,752

SAFETY CAR EQUIPMENT

David W. Lloyd, Webster Groves, Mo.

Application January 9, 1936, Serial No. 58,342

18 Claims. (Cl. 303—6.1)

This invention relates to control apparatus for fluid pressure actuated equipment and particularly to control apparatus for controlling the fluid pressure actuated brakes, door engines and appurtenant devices and sanding equipment of motor driven passenger vehicles such as transit coaches and motor buses, the present application being a division of my copending application, Serial No. 698,243, filed November 16, 1933, and assigned to the assignee of this application.

One type of fluid actuated equipment of a motor driven passenger vehicle comprises fluid pressure brake equipment including a self-lapping brake valve device for controlling the brake equipment, and safety control apparatus equipped with an emergency device for effecting an emergency application of the brakes when the operator's foot is removed from a pedal, so that in the event of incapacitation of the motorman, such as sudden illness or death, the consequent release of pressure on the foot pedal will cause what is commonly known as "dead man's emergency application" of the brakes.

Further equipment includes door engines that are fluid pressure actuated for opening and closing the doors for permitting ingress and egress of passengers, sanding devices whereby sand is discharged upon the rail from a box on the vehicle, circuit breakers or line switches for controlling the supply of electric current to the driving motors of the vehicles and fluid actuated circuit breaker opening or "knock out" devices for opening said circuit breakers under dead man's emergency operating conditions.

It is an object of the invention to provide a self-lapping brake valve device with means operated when the operator becomes incapacitated for causing said brake valve device to operate to effect an application of the brakes.

Another object of the invention is to provide a brake valve device and operating means therefor having the above noted characteristics wherein means are provided for enabling removal of the operator's foot and hand from the pedal and lever, respectively, without effecting dead man's emergency application of the brakes, but only in the event that a service application of the brakes has previously been made which is sufficient to bring the car or vehicle to rest.

A further object of the invention is to provide safety control apparatus for passenger or other vehicles wherein the sanding, door operating and circuit breaker opening equipment is actuated by fluid supplied from the same reservoir to which the supply of fluid is cut off during dead man's emergency brake application operating conditions so that the fluid pressure on the door engines may be balanced upon exhaustion of the reservoir as it blows down to atmosphere through the sand box or knock out device, thus permitting the doors to be opened manually, so that a predetermined quantity of sand only may be discharged from the sand box under dead man's emergency operating conditions, and so that the fluid pressure on the circuit breaker opening device is balanced when the reservoir is exhausted in order that the circuit breaker may be returned manually to closed position.

A further object of the invention is to provide a safety control equipment for passenger vehicles that is flexible in operation and wherein the operation of the equipment in proper sequence is positively insured under both service and emergency brake application operating conditions.

These and other objects of the invention that will be made apparent throughout the further description thereof are attained in the control apparatus herein described and illustrated in the accompanying drawings wherein.

Figures 1, 2, 3:
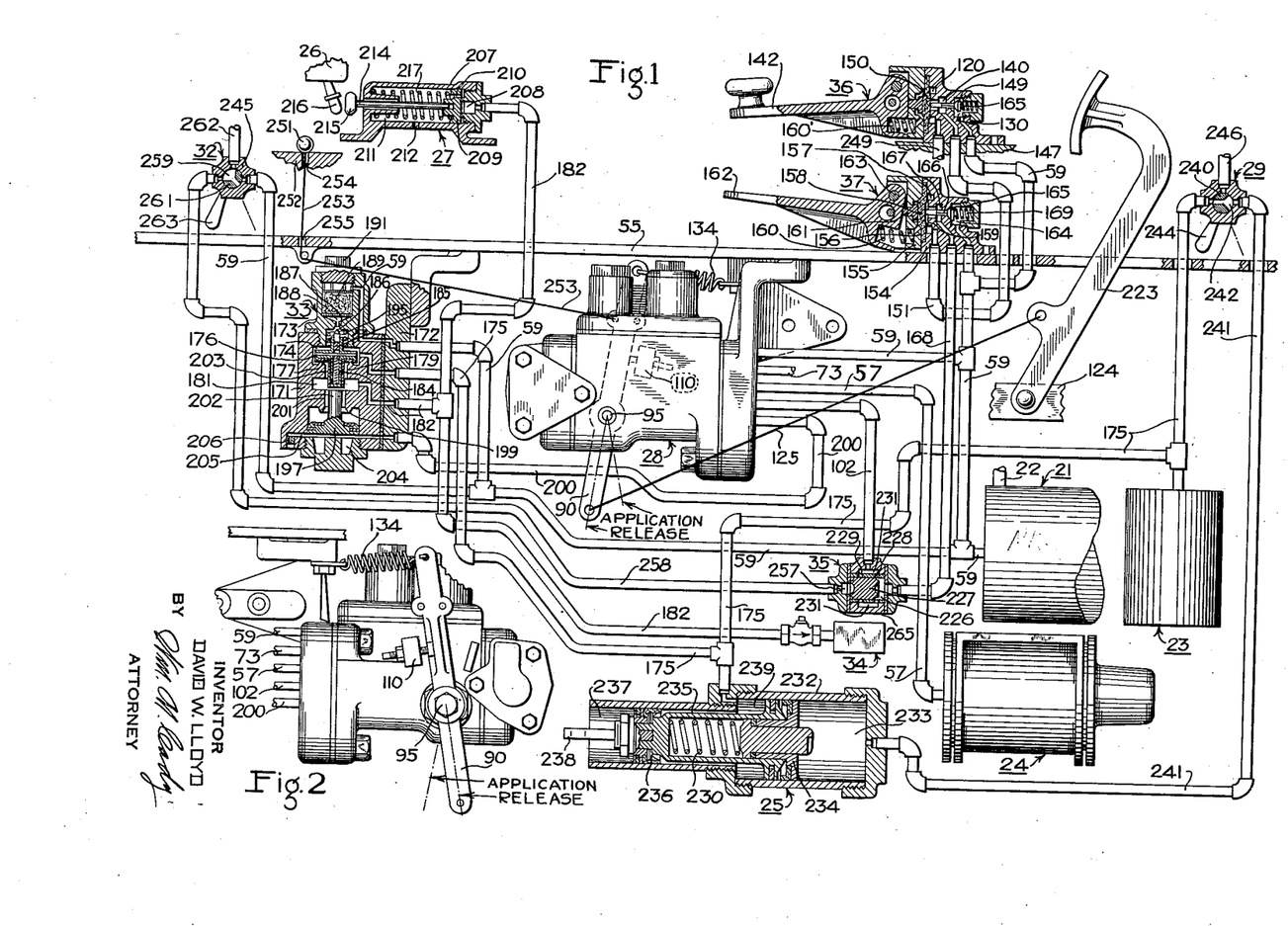
Fig. 1 is a diagrammatic elevational view, partly in section, of the safety car control equipment embodying features of the invention.
Fig. 2 is an elevational view of the improved brake valve device.
Fig. 3 is a vertical sectional view, partly in elevation, of the brake valve device, the view corresponding to a section on line 3—3 of Figure 5 with portions broken away.

Referring to the drawings and particularly to Fig. 1, the apparatus includes a main reservoir 21, supplied with fluid under pressure from a compressor (not shown), through a pipe 22, a sanding reservoir 23, a brake cylinder 24, a door engine 25, a motor controlling circuit breaker 26, a circuit breaker knockout device 27, a self-lapping brake valve device 28, a hand operated door control valve device 29, an auxiliary hand operated brake control valve device 32, an automatic sanding valve device 33, a sand box 34, a double check valve device 35, and hand and foot operated pilot valve devices 36 and 37 respectively.

The brake valve device 28 which is of the self-lapping type comprises a casing, Fig. 3, having a main section 51, a valve section 52, an emergency piston section 53 and a pipe bracket section 54 by means of which the brake valve device is secured to the frame or floor 55 of the vehicle. The sections 52, 53 and 54 are removably secured to the main casing 51 by any desired means, not shown.

The casing sections 51, 52 and 53 when secured together in the manner described, define a pressure chamber 56 which may be constantly in communication with the usual brake cylinder 24 through a passage and pipe 57.

The casing section 52 is provided with a chamber 58 with which the usual main reservoir 21 is in constant communication through a pipe and passage 59. Contained in the chamber 58 and slidably mounted in a bore 61 in the casing section 52 is a supply valve 62 which is adapted to seat on a valve seat 63 carried by a bushing 41 in the casing section 52, and which is subject on one side to the pressure of a coil spring 64. This valve is operated to control communication from the chamber 58 to the chamber 56.

The casing section 52 is provided with a cylinder 65 which is open at one end to the chamber 56, the other end of the cylinder being closed by an adjusting member 66 which has screw-threaded connection with the casing section. This adjusting member is provided with a central bore 67 which on its outer end is tapped to receive a screw-threaded stop member 68.

Operatively mounted in the cylinder 65, adjacent to its open end, is a movable abutment in the form of a piston 69 having a stem 71 which is slidably guided in the member 66 within the inner end of the bore 67. At one side of the piston 69 there is a chamber 72 which is constantly open to the atmosphere through a passage and pipe 73. Contained in the chamber 72 is a coil spring 74 which is interposed between and engages the inner face of the piston 69 and an inner face of the adjusting member 66.

Contained in a valve chamber 75 in the piston 69 which is open to the pressure chamber 56 through a passage 76, is an exhaust or release valve 77 which is adapted to seat on a valve seat 78 formed on the piston, and which is adapted to control communication from the valve chamber 75 to the chamber 72 by way of connecting passages 80 in the piston stem 71. The exhaust valve 77 is provided with a stem 79 having a collar 81 which slidably engages the piston within a central bore 82 and is subject to the pressure of a light coil spring 83 interposed between and engaging the collar 81 and an annular flange 50 on the piston. Outward movement of the valve relative to the piston is limited by the collar 81 engaging a stop flange 70 carried by the piston 69. The outer end portion of the valve stem 79 extends beyond the outer face of the piston and is adapted to be operatively engaged by an operating mechanism which will now be described.

For controlling the operation of the supply and exhaust valves 62 and 77, respectively, I provide a mechanism comprising spaced levers 84, one of which is shown, which are pivotally connected, intermediate their ends, to a pin 85 mounted in a plunger 86 which at one end is slidably guided by the casing section 52 within a bore 87.

At one side of the pivot pin 85 the ends of the levers 84 are connected together through the medium of a pin 88 and loosely mounted on the pin 88 and disposed between the levers is a roller 89 which is adapted to operatively engage the outer end of the exhaust valve stem 79. At the other side of the pivot pin 85, the ends of the levers are connected together by means of a pin 91 on which one end of an operating rod 92 is pivotally mounted. The opposite end of the rod operatively engages one side of the supply valve 62 within a recess 93 formed in the valve.

For the purpose of controlling the operation of the plunger 86 a rocking lever 94 is provided which is rotatably mounted upon a rocking shaft 95, and which is provided with an arm 96 adapted to operatively engage the outer end of the plunger 86. The shaft 95 is mounted for oscillation in the casing section 51 and is adapted to be oscillated by a rocking lever 90 that is fixed to the outer end of the shaft exteriorly of the casing section 51, Figs. 1, 2 and 3. The rocking lever 94 is also provided with a cam arm 97, the purpose of which will hereinafter appear.

The rocking lever 94 is adapted to be rotated in a counterclockwise direction, Fig. 3, when the rocking shaft 95 is turned in a similar direction, by means of a lug 301 that is integral with a lever 98 that is fixed to the shaft 95 by means of a key 99. When the shaft 95 is turned in a counter-clockwise direction the lug 301 engages the lever 94 and causes it to turn with the shaft. The lever 94 may, however, turn in a counterclockwise direction independently of the lever 98.

Figure 5:
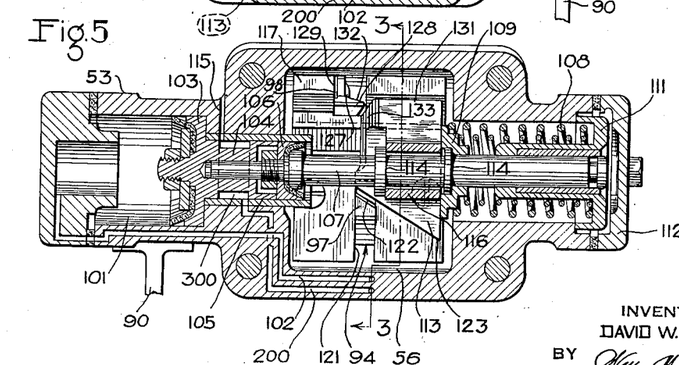
Fig. 5 is a vertical sectional view of the apparatus shown in Fig. 3, taken on the line 5—5 of Fig. 3.

Within the emergency device section or casing 53 is a chamber 101, Fig. 5, that is in communication with a safety control passage or pipe 102 and which contains a piston 103 having a stem 104 extending into a bore 105 which opens into the chamber 56. A piston 106 is slidably mounted within the bore 105 and is provided with a stem 107 which is biased toward the left or emergency position by means of a double spring 108 that is disposed between a collar 109 which bears against one of a pair of spaced flanges 114 on the stem and the guide bushing 111 which is clamped between the casing 53 and a closure cap 112. A cam block 113 is provided which is adapted for movement with the stem 107, by means of a yoke portion 116 which fits over the stem 107 and which is locked between the flanges 114.

The piston 103 and the piston 106 are normally held in the right or release position by means of fluid under pressure supplied to the chamber 101 through the safety control passage 102 against the opposing pressure of the spring 108.

In normal position, as shown in Fig. 5, passage 200, leading to the emergency sanding device is connected through an annular chamber 300 in piston stem 104 with an exhaust passage 115, but when the piston 103 is moved to the left, the chamber 300 is moved out of registry with passage 200, thereby closing communication from passage 200 to the atmosphere, the movement of piston 106 to the extreme left, uncovering passage 200, so that the brake valve chamber 56 is connected to passage 200.

A guide block 117 is fixed to the casing 51 within the chamber 56 and is provided with an undercut groove 118 for receiving a dove-tailed tongue 119 on the inner face of the cam block 113 so that the block 113 may slide freely in the direction of the piston stem 107 and be moved by the stem from the release position shown in Fig. 5 to an emergency position when the stem 107 is moved by the spring 108 to emergency position.

As shown in Fig. 5, the guide block 117 is provided with a vertical slot 121 through which the arm 97 of the lever 94 extends as shown in Figs. 3 and 5. The cam arm 97 is provided with an inclined cam face 122 that is adapted to be engaged by a similarly inclined cam face 123 on the cam block 113 when the cam block is moved by the stem 107 to emergency position by the spring 108. As the cam block 113 moves to emergency position or toward the left, Fig. 5, the cam surface 123 engages the cam face 122 on the arm 97 and forces the cam arm 97 downwardly, thereby rotating the lever 94 in a counter-clockwise direction, so that as the cam block 113 is moved to the left, the arm 96 of the lever 94 forces the plunger 86 upwardly and causes an application of the brakes in a manner to be hereinafter described. When the cam block 113 is in its extreme left or emergency position, the plunger 86 is moved upwardly so as to effect a full application of the brake in a manner to be hereinafter more fully described.

Figures 3, 4, 6:
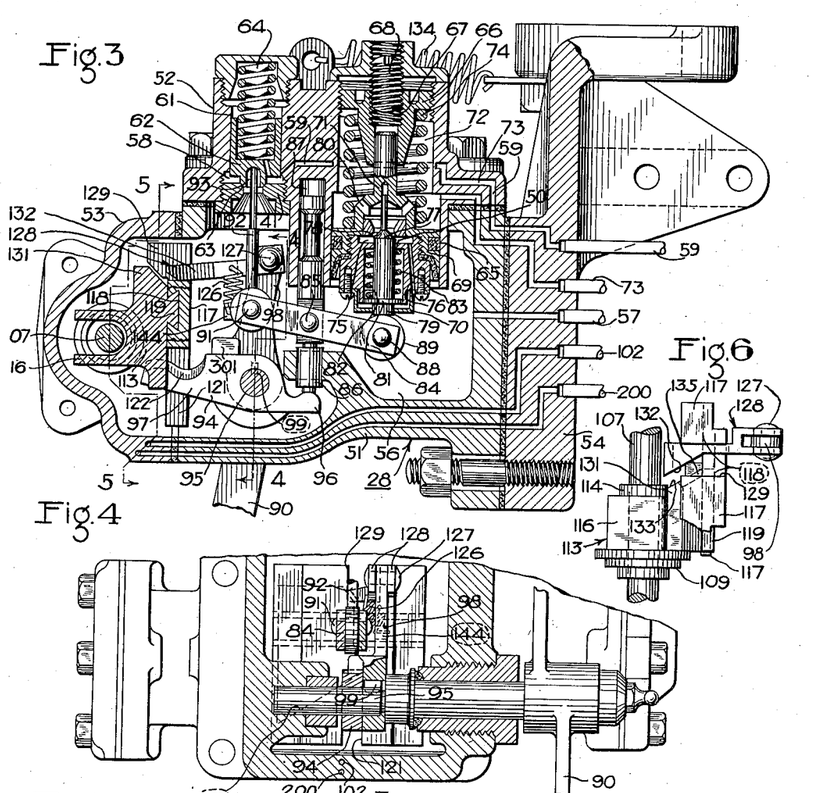
Fig. 4 is a vertical sectional view, of the apparatus shown in Fig. 3, taken on the broken line 4—4 of Fig. 3.
Fig. 6 is a fragmental top plan view of details of the interlocking mechanism.

Interlocking mechanism is provided in the brake valve device for preventing movement of the piston 103 and the cam block 113 to emergency position in the event that the plunger 86 has been moved manually through the medium of the operating lever 90 and the foot pedal 223, Fig. 1, that is pivotally connected to a part of the vehicle frame 124 and which is connected to the operating lever 90 by means of a cable 125 as shown in Fig. 1. The interlocking mechanism comprises the lever 98 that is fixed to the operating shaft 95 and which is pivotally connected by a pivot pin 127 to an interlocking bar 128 that is adapted to extend through a slot 129 in the upper edge of the guide block 117 and to be moved across the path of movement of a cam lug 131 integral with the cam block 113 when the shaft 95 and levers 93 and 94 are rotated in a counter-clockwise direction through the medium of the foot pedal, a distance sufficient to effect a service application of the brakes with a brake cylinder pressure of a predetermined desired degree, such as, for example, a brake cylinder pressure approximating 25 pounds. With the interlocking bar 128 moved across the path of movement of the cam lug 131, movement of the cam block 113, the piston stem 107 and piston 106 to left or emergency position, is prevented in the event of a reduction in pressure of the fluid in the chamber 101. The interlocking bar 128, as indicated in Fig. 6, is provided with an inclined face 132 that is adapted to be engaged by an inclined face 133 on the cam lug 131 when the cam block 113 is moved toward the left or toward emergency position while the interlocking bar 128 is in the locking position above described. With the inclined face 133 of the cam block 113 in engagement with the inclined face 132 of the interlocking bar 128, withdrawal of the interlocking bar to the normal release position shown in Fig. 3 is opposed by the cam lug 131. Consequently the operator is prevented from releasing the brakes until the fluid pressure in the safety control pipe 102 and the piston chamber 101 has been restored to normal pressure or to a pressure sufficient to overcome the tension of the spring 108 and to force the cam lug 131 to the right out of engagement with the inclined face 132 of the interlocking bar 128. The interlocking bar 128 is yieldingly urged into contact with the bottom of slot 129 in guide block 117 by a spring 126 attached at one end to the bar and at the other end to a lug 144 carried by the lever 98. The upper edge of the face 133 on cam block 113 is beveled at 135 (see Fig. 6) in order to insure that the upper edge of cam face 133 will not catch on the locking bar 128 when the locking bar 128 projects an insufficient distance out of slot 129 on the cam block side of guide block 117, and cause undesired prevention of movement of cam block 113 to emergency position.

After pressure has been restored in the safety control pipe and the cylinder 101, the operator may cause movement of the brake switch device to release position by releasing pressure on the foot pedal 223. Referring to Figs. 1 and 2, the operating lever 90 is normally yieldingly held in release position by a spring 134 that is connected to the upper end of the lever 90 and to the casing section 52 of the brake valve device. When the operator relieves the pressure upon the foot pedal 223, the spring 134 returns the operating lever and brake valve device to release position.

The supply of fluid from the main reservoir 21 to the emergency piston chamber 101 of the brake valve device 28 is controlled by means of the hand operated pilot valve device 36 and a foot operated pilot valve device 37, Fig. 1.

The foot operated safety control valve device 37 may comprise a casing having a pipe bracket section 154 and a lever supporting section 155 that is secured to the casing section 154 with a diaphragm 156 clamped therebetween. The diaphragm 156 has a chamber 157 at one side and carries a valve portion 158 that is adapted to engage an annular valve seat rib 159. The diaphragm 156 also carries a stem 161 that is adapted to be operated by a foot pedal 162 that is pivoted on a pin 163 carried by the pedal supporting casing 155. The pipe bracket casing 154 is also provided with a valve chamber 164 containing a valve 165 having a stem 166 that is adapted to be actuated by the diaphragm 156 through the medium of the stem 166. Disposed between the chamber 157 and the valve chamber 164 is a central chamber 167 that is connected to the safety control pipe 168 and through which the stem 166 of the valve 165 extends into engagement with diaphragm valve 158. A spring 169 disposed in the valve chamber 164 serves to normally retain the valve 165 seated and the diaphragm valve 158 unseated. When the foot pedal 162 is in the release position shown in Fig. 1, the spring 169 overcomes the pressure imposed on the stem 161 by the pedal 162 and holds the valve 165 seated and the valve 158 unseated. With the valve 165 seated and the valve 158 unseated, the safety control pipe 168 is connected to the pipe 151. When the operator's foot is placed upon the pedal 162, the pedal is depressed by the pressure exerted thereby and moves the diaphragm valve 158 to seated position and unseats the valve 165 against the action of the spring 169. With the valve 158 seated and the valve 165 unseated, the safety control pipe 168 is connected to the fluid pressure supply pipe 59 which is connected to the main reservoir 21.

The hand operated pilot valve device 36 is identical in construction to the pilot valve device 37 with the exception that the operating lever 142 is adapted for hand operation. The purpose of the hand operated control device 36 and the foot operated control device 37 will hereinafter appear.

The sanding valve device 33 comprises a casing 171 having a valve chamber 174 connected through pipe 175 with the sanding reservoir 23 and containing a disk valve 176 for controlling communication from chamber 174 to a chamber 181 which is connected to pipe 182 leading to the cylinder of the circuit breaker device 27. A poppet valve 186 is carried by the valve 176 and controls communication from main reservoir pipe 59 to chamber 174, the valve 176 being urged to its seat by spring 195. For operating the valve 176, a piston 197 is provided having a stem 202, adapted to engage a stem 203 on the valve, when the piston is moved upwardly.

The under or lower face of the piston 197 is subject to the pressure of fluid within the chamber 204 within the casing 171 and which chamber is normally open to atmosphere through passage and pipe 200 which leads to the brake valve device 28 and through the annular chamber 300 in the emergency piston stem 104 and the atmospheric passage 115. Under emergency operating conditions, as will hereinafter appear, fluid at brake cylinder pressure is supplied to the chamber 204 of the sanding valve device 33, from the chamber 56 of the brake valve device 28 through passage and pipe 200 and the fluid acting on the under face of the valve piston 197 forces it upward so that the valve stem 202 engages the stem 203 of the valve 176 and causes it to be lifted from its seat 177 against the action of the spring 195, and the poppet valve 186 to be moved into closed position upon seat 187, thereby cutting off the supply of fluid from the main reservoir to the sanding reservoir in a manner to be hereinafter described.

The circuit breaker opening or knock-out device 27 is for the purpose of moving the circuit breaker 26 to open position under emergency operating conditions and is adapted to be actuated for opening the circuit breaker by fluid under pressure when operating fluid is supplied to the sanding pipe 182 during an emergency operation. The knock-out device comprises a casing 207 having a chamber 208 containing a piston 209 adapted to reciprocate within the chamber 208 and which is provided with a restricted port 210 through which fluid under pressure may flow from the chamber 208 to the chamber 211 at the left side of the piston. The chamber 211 is open to the atmosphere through atmospheric port 212. The piston is provided with a guide stem 214 which projects exteriorly of the casing 207 and which is provided with a knob 215 that is adapted to engage a trip lever 216 of the circuit breaker 26. The piston 209 is adapted to be moved to the left by fluid under pressure supplied to the chamber 208 from the sanding pipe 182 under emergency operating conditions against the action of a spring 217 disposed between the piston 209 and the end of the casing 207, and after a dead man's emergency brake application, and when the pressure in the chamber 208 is reduced sufficiently by reason of the blow-down of fluid from the pipe 182 through the restricted port 210 and the atmospheric port 212, the spring 217 forces the piston to the right or normal position shown in Fig. 1.

The double check valve device comprises a casing having a chamber 226 containing a double check valve 227. In one seating position, the check valve establishes communication from pipe 168 to pipe 102 and in the other seating position, said communication is cut off and communication is established from a pipe 258 to pipe 102.

The door engine device 25 comprises a casing 232 having a piston chamber 233 containing a piston 234 which carries a stem 235 that is provided at its end with a piston 236 of less diameter than that of the piston 234 and which is adapted to operate within a bore 237 which is open at one end to the atmosphere. The piston 236 carries an operating rod 238 which may be pivotally connected to operating mechanism for the entrance doors, not shown. The chamber 239 between the pistons 234 and 236 is always open to the sanding reservoir 23 through passage and pipe 175. Fluid under pressure is always supplied to the piston chamber 239, from the sanding reservoir 23 through pipe 175, and the piston chamber 233 which is normally open to the sanding reservoir is supplied with fluid under pressure through pipe 175, port 242 in the valve plug 240 of the door control valve device 29 and pipe 241. The fluid under pressure acting on the right face of the piston 234 retains it in its left or door closed position shown in Fig. 1, against the opposing pressure of the fluid in the chamber 239 acting on the reduced effective area of the left face of the piston. When, however, the chamber 233 is open to atmosphere in a manner to be hereinafter described, the greater fluid pressure within the chamber 239 acting on the left face of the piston 234 causes the piston to move to the right or door open position and to open the entrance door, not shown.

In operation, assuming that the parts of the apparatus are in release position, as shown in Figs. 1 and 3 with the exception of the foot operated pilot valve device 37 which is shown in the emergency position, and that the operator's hand is resting upon the hand operating lever 142 of the hand operated pilot valve device 36, the sanding reservoir 23 is charged with fluid under pressure from the main reservoir 21 through pipe and passage 59, filter chamber 188, of the sanding valve device 33 past the open poppet valve 186, valve chamber 174 and passage and pipe 175. Fluid under pressure flows from the pipe 175 to the chamber 239 of the door engine device 25 and fluid under pressure also flows from the sanding reservoir 23 to the piston chamber 233 of the door engine device 25 through pipe 175, port 242 in the manually operated valve device 29 provided for controlling the operation of the door engine device when said valve device is in the door closing position, and pipe 241, and the fluid under pressure in the chamber 233 acting on the right face of the piston 234 holds the door engine device in door closed position shown in Fig. 1 against the pressure of the fluid at sanding reservoir pressure in the chamber 239.

It will here be understood that the hand operated pilot valve device 36 and the foot operated pilot valve device 37 are so interconnected that either the hand lever 142 or the foot pedal 162 must be depressed in order to maintain fluid under pressure in the safety control pipe 102 and that when either or both the levers 142 and the foot pedal 162 is or are depressed, fluid under pressure is supplied to the safety control pipe 102 and to the chamber 101 of the emergency piston device, Fig. 5. As shown, the hand operating lever 142 is depressed while the foot pedal 162 is yieldingly held in release position by the spring 160. With the lever and foot pedal in the position shown in Fig. 1, fluid under pressure is supplied from the main reservoir to the emergency piston chamber 101 through pipe and passage 59, valve chamber 130 of the pilot valve device 36, past the open valve 149, chamber 149, pipe 151, chamber 157 of the pilot valve device 37, past the open diaphragm valve 158, chamber 167, pipe 168, check valve chamber 226, port 228, annular chamber 231, passage and pipe 102, Figs. 3 and 5.

With the foot pedal 162 depressed as by the foot of the operator resting upon it, diaphragm valve 158 is closed and valve 165 is open and fluid under pressure is supplied to the emergency piston chamber 101 regardless of the position of the hand lever 142, through pipe and passage 59, chamber 164, past the open valve 165, chamber 167, passage and pipe 168, and through the check valve 35 and pipe and passage 102 in the manner just described. From the foregoing, it is apparent that fluid under pressure is supplied from the main reservoir to the emergency piston chamber 101 so long as either the operating handle 142 or the foot pedal 162 is depressed.

If the operator should remove his hand and foot simultaneously or concurrently from the levers 142 and 162, communication is established from the emergency piston chamber 101 to the atmosphere through passage and pipe 102, annular chamber 231, port 228, chamber 226, pipe and passage 168, chamber 167 of the pilot valve device 37, past the open diaphragm valve 158, passage and pipe 151, chamber 140, past the open diaphragm valve 150, chamber 120 and exhaust passage and pipe 249. As will hereinafter appear, opening of the emergency piston chamber 101 to the atmosphere effects an emergency application of the brakes, sanding of the rails, balancing of the fluid pressure acting on the door engine so that it may be opened manually, and interruption of the power circuit through opening of the circuit breaker 26 by the knock-out device 27.

It will here be understood that the above described brake controlling apparatus is employed in an electrically driven vehicle wherein the power supplied to the driving motors of the vehicle is controlled by a foot operated controller device, not shown, the movement of the controller shaft being effected by movement of the toe of the operator which rests upon a foot pedal, not shown, and that while the car is running, one foot of the operator rests upon the pilot valve foot pedal 162 while the other foot rests upon the controller pedal, not shown.

When it is desired to effect an application of the brakes, the foot of the operator which is used to operate the controller pedal is removed from the controller pedal and placed upon the foot pedal 223 for effecting desired movement of the brake valve device 28.

Should the operator desire to remove his foot from the pilot valve foot pedal 162 for effecting operation of the controller pedal, not shown, as when starting the vehicle on a grade, the operator must first press the hand operating lever 142 so that the safety control pipe pressure will be maintained and so that an emergency application of the brakes will not be effected.

Assuming that one foot of the operator is resting upon and is depressing the pilot valve foot pedal 162, that the operator's other foot is resting on and depressing the controller pedal, not shown, that the hand lever 142 is in its upper or emergency position, that the car is running and that the operator desires to effect an application of the brakes, the operator removes his foot from the controller pedal, not shown, thereby cutting off the supply of power to the driving motors and gradually depresses the foot pedal 223 so as to effect counter-clockwise movement of the brake valve device operating lever 90, Fig. 1, and Fig. 3.

Counter-clockwise movement of the operating lever 90 turns the shaft 95 and the rocking lever 94 through the medium of lever 98 and lug 301 in counter-clockwise direction, Fig. 3. The end 96 of the lever 94 presses the plunger 86 upward, carrying with it the pin 85 about which the lever 84 is pivoted. Since the spring 64 acting on one side of the supply valve 62 offers greater resistance to the inner movement of the lever 84 than does the spring 83 acting on the release valve 77, the supply valve 62 and rod 92, during the initial movement of the plunger 86 towards upper position, or application position, are maintained stationary, so that the pin 91 forms a stationary fulcrum for one end of the lever 84. As the plunger 86 and pin 85 are moved towards the upper position by action of the foot pedal 223, the lever 84 is caused to rock about the pin 91 in a counter-clockwise direction and as the levers are thus moved, the roller 89 moving therewith causes the exhaust or release valve 77 to be seated against the opposing pressure of the spring 83, thus closing the atmospheric communication from chamber 56 in the brake valve device and consequently, from the brake cylinder 24 to atmosphere through passage and pipe 73.

When the release valve 77 is seated, the value of the spring 74 acting on the piston 69 being greater than the value of the spring 64 acting on the valve 62, the piston 69 will remain stationary, so that the pin 88 now becomes the fulcrum for the lever 84, so that as the pedal 223 is further depressed and causes further rotation of the lever 94 in a counterclockwise direction and further upward movement of the plunger 86, the rod 92 is moved upward and causes the supply valve 62 to be unseated against the opposing pressure of the spring 64, and the fluid under pressure in the chamber 58 supplied from the main reservoir through pipe and passage 59 flows to the brake cylinder 24 through pressure chamber 56 in the brake valve device and passage and pipe 57 thus effecting an application of the brakes.

Now, as soon as the pressure in the pressure chamber 56 acting on one side of the piston 69 has been increased to a degree slightly exceeding the opposing pressure of the spring 74 acting on the other side of the piston, the piston will move outwardly. As the piston 69 is thus being moved, the action of the spring 64 causes the supply valve 62 to move toward its seat 63. Through the medium of the rod 92, the action of the valve 62 causes the levers 84 to rock about the pivot pin 85 in a counterclockwise direction, maintaining the exhaust valve 77 closed. When the supply valve 62 seats on the valve seat 63, the further flow of fluid under pressure from the main reservoir to the chamber 56 is closed off and the upward movement of the piston 69 is stopped by the action of the spring 74. Since the piston 69 is brought to a stop at substantially the same time as the supply valve 62 seats, the spring 64 through the medium of the rod 92, pin 91, levers 84, pin 88, rollers 89 and exhaust valve stem 79 will maintain the exhaust valve 77 seated. Thus the brake valve device is automatically operated to lap the supply valve while holding the exhaust valve closed.

If, when the several parts of the brake valve device have been moved to lap position as just described, it is desired to reduce brake cylinder pressure, the operator reduces the pressure of his toe on the foot pedal 223 so as to permit the spring 134 to turn the operating lever 90 in a clockwise direction (Figures 1 and 3) and through the medium of the cable 125, to follow the movement of the toe of the operator. As the operating lever 90 moves toward the release position the plunger 86 moves downward and the spring 83 acts to unseat the exhaust valve 77. As the valve 77 is being unseated the rocking lever 84 is turned in a clockwise direction about the pin 91, which is maintained stationary by the resistance offered by the spring 64 through the medium of the supply valve 62 and the rod 92.

With the exhaust valve 77 thus unseated, the fluid under pressure is released from brake cylinder 24 to the atmosphere through pipe and passage 57, chamber 56 in the brake valve device, passage 76 in the piston 69, chamber 75, past the unseated exhaust valve 77, passages 80 in the piston stem 71, spring chamber 72 and atmospheric passage and pipe 73.

The operator permits such release movement of the pedal 223 as will provide the desired graduated release, and if he holds the pedal stationary in this position, then fluid will release from the brake cylinder until the spring 74 has moved the piston 69 into seating engagement with the exhaust valve 77 and then further release of fluid from the brake cylinder is cut off.

With the exhaust valve 77 seated, the release of fluid under pressure from the brake cylinder 24 and pressure chamber 56 is closed off, consequently the piston 69 will come to a stop without rocking the levers 84 to unseat the supply valve 62, thus the brake valve device is automatically lapped after a reduction in brake cylinder pressure has been effected. To effect a complete release of the brakes, the toe of the operator is raised sufficiently to permit the spring 134 to return the operating lever 90 to release position, shown in Figs. 1 and 3, wherein its movement is arrested by engagement of the free end of the lever 90 with a stop lug 110 on the casing 51, which limits the upward movement of the pedal 223 to release position, shown in Fig. 1. As the rocking lever 94 is being turned in a clockwise direction by the operating lever 90 to the release position, the action of the spring 83 causes the exhaust valve 77 carried by the piston 69, to be unseated as before described, permitting fluid under pressure to flow from the chamber 56 and brake cylinder 24 to the atmosphere. As the pressure of fluid in chamber 56 reduces, the piston 69 is caused to move toward full release position by the action of the spring 74, but spring 83 keeps the exhaust valve 77 unseated so that piston and valve move downwardly simultaneously and together, causing the lever 84 to rock in a clockwise direction about the pin 91. Through the medium of the pin 85, this movement of the lever causes the plunger 86 to move downwardly toward the position in which it is shown in Fig. 3. Since the supply valve 62 is maintained seated and the exhaust valve unseated, the brake cylinder 24 is maintained open to atmosphere, and consequently the complete release of the brakes is effected.

It is apparent from the foregoing, that the value of the fluid pressure supplied to the brake cylinder depends upon the position of the operator's foot and the position of the plunger 86 and when the operator's foot pedal 223 is fully depressed so as to move the plunger 86 to its extreme upper position, the supply valve 62 is moved to open position against the action of spring 64. Fluid under pressure then supplied to chamber 56 and acting on the piston 69 forces it upward until the stem 71 engages the stop member 68, permitting the plunger 86 to move upward to its extreme upper position and maintain the supply valve in open position. Brake cylinder pressure then may equalize with main reservoir pressure and apply the brakes with maximum force.

The operating mechanism is so designed that the vehicle may be readily brought to rest by moving the foot pedal to such position that a brake cylinder pressure of from 20 to 25 pounds is obtained.

When the car has been brought to rest and the operator desires to cause opening of the door, not shown, to permit entrance or exit of a passenger, the operating handle 244 of the door engine controlling valve device 29 is moved to the door open position shown in dotted lines in Fig. 1, corresponding to the position of the plug valve 245 of the auxiliary brake controlling valve device 32, wherein the wide portion of the port 242 connects the pipe 241 with the atmospheric pipe 246 so that fluid under pressure within the piston chamber 233 of the door engine device 25 is vented to atmosphere through pipe 241, port 242 in the valve device 29 and atmospheric pipe 246. As the pressure of the fluid in the piston chamber 233 is reduced in the manner above described, the greater fluid pressure in the piston chamber 239 acting on the left face of the piston 234 forces the piston to the right or to the door open position causing the operating rod 238 to actuate the door operating mechanism, not shown, to the door open position.

In order to close the door, the operating handle 244 of the door engine valve device 29 is returned to the door closed position wherein the sanding reservoir 23 is again connected to the piston chamber 233 through pipe 175, port 242 of the valve device 29 and pipe 241. As the pressure of the fluid in the chamber 233 increases to that of the sanding reservoir, the fluid under pressure acting on the right face of the piston 234, which face is of greater effective area than the left face of the piston, overcomes the pressure of the fluid in the chamber 239 acting on the left face of the piston and forces the piston 234 to the left or door closed position shown in Fig. 1.

After the door has closed and it is desired to again start the car in motion, the toe of the operator is removed from the foot pedal 223 so that the spring 134 may return the operating lever 90 to the release position shown in Figs. 1 and 3, wherein the brake valve device parts are in position to vent fluid from the brake cylinder 24 to the atmosphere and close the supply valve so as to cut off the supply of fluid from the main reservoir to the chamber 56 of the brake valve device.

Dead man's emergency features are provided in the apparatus for effecting an emergency application of the brakes in the event that the operator becomes incapacitated and removes both his hand and foot from the hand lever 142 and the foot pedal 162, respectively. Under dead man's emergency operating conditions, sand is automatically supplied to the rails from the sand box 34, the circuit breaker 26 for controlling the electric current supplied to the motors is moved to open position for cutting off the supply of power to the motors and finally the door engine device 25 is so balanced that it may be moved manually by the passengers to door open position, should it become necessary.

Under dead man's emergency operating condition, should the operator become incapacitated and remove his foot from the foot pedal 162 and his hand from the hand lever 142, release of pressure applied by the operator to the lever and pedal causes them to be moved by their respective springs 160 and 160' to emergency position, such as the position of the lever 162 shown in Fig. 1, wherein the diaphragm valves 158 and 150 are open and the valves 165 and 149 are closed. With the valves 158 and 150 open and the valves 165 and 149 closed fluid under pressure is vented from the emergency piston chamber 101 and the safety control pipe 102 through the safety control pipe 102, annular chamber 231 of the check valve device 35, port 228, valve piston chamber 226, pipe 168, chamber 167 of the pilot valve device 37, past the open diaphragm valve 158 of the foot operated pilot valve device 37, chamber 157, pipe 151, chamber 140 of the hand operated pilot valve device 36, past the open diaphragm valve 150, chamber 120 and atmospheric pipe 249. As the fluid under pressure in emergency piston chamber 101 is reduced to atmosphere in the manner above described, the spring 108 forces the piston stem 107 to the left or emergency position, carrying with it the cam block 113. As the cam block 113 moves toward the left, the inclined cam face 123 thereof engages the cam face 122 on the end 97 of the lever 94 and causes it to be depressed so that the lever 94 is rotated in a counter-clockwise direction, Fig. 3, sufficiently to move the plunger 86 to its extreme upper emergency or full application position. With the plunger 86 in full application position, the exhaust valve 77 is closed and the supply valve 62 is open so that fluid is supplied from the main reservoir 21 to the brake cylinder 24 through the brake valve device in the manner hereinbefore described. Since the brake cylinder 24 is supplied with fluid at the maximum pressure of that in the main reservoir, the brakes are applied with maximum force and the vehicle is quickly brought to rest.

As the piston stem 107 is moved to the left by the spring 108, the piston 106 is moved to a point between the passage 200 and the atmospheric passage 115 so that communication from the passage 200 to the atmosphere through annular chamber 300 and passage 115 is cut off and communication is established from the chamber 56 of the brake valve device to the chamber 204 of the automatic sanding valve device 33 through passage and pipe 200. Fluid under pressure at brake cylinder pressure is supplied from the chamber 56 to the chamber 204 of the sanding valve device and acting on the lower face of the piston 197 moves the piston upward so that stem 202 engages the stem 203 of the valve 176 and moves the valve from its seat, and at the same time moving the poppet valve 186 into engagement with its seat, thereby cutting off the supply of fluid from the main reservoir 21 to the sanding reservoir 23 and at the same time opening communication from the sanding reservoir 23 to the sand box 34 and the chamber 208 of the knock-out device 27, through pipe and passage 175, valve chamber 174, past the open valve 176, bore 179, chamber 181 and passage and pipe 182. The fluid under pressure supplied to the sand box 34 from the sanding reservoir 23 causes sand to be supplied to the rail in the well known manner and under dead man's emergency operating condition. The fluid under pressure supplied from the sanding reservoir 23 to the piston chamber 208 of the knock-out device 27 causes the piston 209 to be moved to the left against the action of the spring 217, thereby forcing the trip lever 216 of the circuit breaker 26 to circuit breaker open position thereby effecting opening of the circuit breaker 26 controlling the electric current supplied to the driving motors of the vehicle.

As the piston 209 of the knock-out device 27 moves to the knock-out position, it uncovers atmospheric port 212 so that fluid under pressure is vented from the sanding reservoir 23 and chambers 239 and 233 of the door engine device 25 to the atmosphere through pipe 175, valve chamber 174, past the open valve 176, bore 179, chamber 181, passage and pipe 182, piston chamber 208 and atmospheric port 212. Thus, since the pistons 234 and 236 of the door operating device are subjected to atmospheric pressure on both sides, the opposing pressure forces acting thereon are balanced and the vehicle door may be opened manually, if desired. A port 210 is provided in the piston 209 through which fluid under pressure may flow from the sanding reservoir in the manner described after the pressure has been reduced sufficiently to permit the spring 217 to return the piston 209 to normal position so that the sanding reservoir 23 may blow down to atmosphere after a dead man's emergency operation. Since sand flows from the sand box 34 so long as fluid is supplied thereto, the sanding operation will be discontinued when fluid no longer flows from the sanding reservoir to the sanding box as when the sanding reservoir has blown down to atmosphere.

In order to release the brakes after a dead man's emergency operation, either the hand lever 142 or the foot pedal 162 is depressed so that fluid under pressure may flow from the main reservoir 21 to the safety control pipe 102 and the emergency piston chamber 101 through pipe 59, valve chamber 164 of the foot controlled controlling valve device 37 if the foot pedal 162 is depressed, past the open valve 165, chamber 167, passage and pipe 168, chamber 226 of the check valve device 35, port 228, annular chamber 231, and pipe 102. As fluid at main reservoir pressure is supplied to the chamber 101 in the manner described, the piston 103 and therefore the cam block 113 is forced to the right or to release position, and the rocking lever 94, Fig. 3, is thus free to be returned in a clockwise direction by the action of springs 83 and 64 as they respectively effect opening movement of the exhaust valve 77 and closing movement of the supply valve 62. With the exhaust valve 77 in open position and the supply valve 62 closed, fluid under pressure is vented to the atmosphere from the brake cylinder 24 in the manner described and the supply of fluid from the main reservoir to the chamber 56 of the brake valve device is cut off. Release of the brakes is thus effected.

It is desirable to permit the operator, after he has depressed the foot pedal 223 sufficiently to effect a service application of the brakes or sufficiently to effect delivery of fluid under pressure to the brake cylinder at a pressure of 25 pounds, to remove both his hand and foot from the hand lever 142 and the foot lever 162 for the purpose of attending to other duties such as observing the clearance between a parked vehicle and the vehicle controlled by the operator, without effecting an emergency application of the brakes even though the emergency piston chamber 101 has been vented to the atmosphere as a result of the removal of pressure applied by the operator to the said hand lever and foot pedal.

Referring particularly to Figs. 3, 4, 5 and 6, when the operating lever 90 has been turned in a counter-clockwise direction sufficiently to effect a service application of the brakes with a fluid pressure of 25 pounds in the brake cylinder, the lever 98 which is fixed to the shaft 95 moves the interlocking bar 128 to the left so that it extends across the path of movement of the upwardly extending locking lug 131 on the cam block 113. Consequently, when the spring 108 forces the valve piston stem 107 to the left as a result of the reduction in fluid pressure in the emergency piston chamber 101, the inclined face 133 of the locking lug 131 engages the inclined face 132 of the interlocking bar 128 and prevents further movement of the stem 107 to the left. Consequently, the piston 106 is not moved sufficiently to uncover the passage 200 or to interrupt its communication with the atmosphere through the passage 115. The piston 197 of the sanding valve device 33 will therefore remain in its normal lower position and therefore, sanding of the rails and opening of the circuit breaker 26 will not be effected.

Since the inclined face 133 of the locking lug 131, Figs. 5 and 6, is yieldingly pressed against the inclined face 132 of the locking bar 128 by the spring 108, and since the interlocking bar 128 is being pressed against the side of the slot 129, the interlocking bar 128 is held against return movement and will remain thus locked until fluid under pressure is again supplied to the chamber 101 with sufficient pressure to overcome the tension of the spring 108 and move the piston 103 and cam block 113 to release position shown in Fig. 5. The locking bar 128 thus prevents release movement of the operating arm 90 and rocking lever 94 for effecting release of the brakes until the hand or foot of the operator has been applied to the hand lever 142 or to the foot pedal 162 with sufficient pressure to depress it for effecting a supply of fluid under pressure from the main reservoir to the safety control pipe 102 and the emergency piston chamber 101.

After fluid under pressure has been supplied from the main reservoir to the emergency piston chamber 101 in the manner above described, the brakes may be released by relieving the pressure on the foot pedal 223 and permitting the spring 134 to return the operating lever 90 to release position.

In order that the brake valve device 28 may be operated from the end of the car opposite that containing the foot pedal 223, an operating ball 251 is supported upon a supporting bracket 252 and is connected to the operating lever 90 by means of a cable 253 which extends through a hole 254 in the supporting bracket and a hole 255 in the floor 55 of the vehicle. By pulling the ball 251 away from the support, the brake valve device is operated to any desired position for effecting any desired degree of brake application.

Since an emergency application of the brakes is effected when the operator relieves the manually applied pressure from the hand lever 142 and the foot lever 162 as in the manner hereinbefore described and since release movement of the brake valve device is then prevented, means are provided at the end of the vehicle having the operating ball 251 for supplying fluid under pressure from the main reservoir to the safety control pipe 102 and the emergency piston chamber 101 for effecting release of the interlocking bar 128 which comprises an auxiliary valve device 32, which is normally positioned, as shown in Fig. 1. The chamber 257 in the check valve device 35 is normally open to the atmosphere through pipe 258, port 259 in the plug valve 261 and atmospheric pipe 262. In operating the brake system from the end of the car provided with the ball operating device 251, the operating handle 263 of the valve device 32 is first moved to release position shown in dotted line in Fig. 1, so that communication from the pipe 258 to the atmospheric pipe 262 is cut off and communication is established from the pipe 59 connected to the main reservoir 21 to the pipe 258. With the plug valve 261 in release position, fluid under pressure flows from the main reservoir 21 to the emergency piston chamber 101 through pipe 59, port 259 in the plug valve 261, pipe 258, chamber 257 in the check valve device 35, port 229 and pipe 102. The fluid under pressure then supplied to the emergency piston 101 forces the emergency piston 103 to the right or release position, thereby relieving the fluid pressure acting on the piston 197 of the sanding valve device and permitting the spring 195 thereof to return the valve 176 to its normal seated position so that fluid under pressure may again flow from the main reservoir to the sanding reservoir 23 in the manner hereinbefore described. Seating of the valve 176 of the sanding reservoir cuts off the supply of fluid under pressure from the sanding reservoir 23 to the sand box 34 and to the knock-out device 27.

With the fluid pressure restored in the emergency piston chamber 101, the brakes may be controlled as desired through the medium of the operating ball 251.

Summarizing, the improved brake controlling apparatus includes a main reservoir, a sanding reservoir, a brake cylinder, a door engine for operating the vehicle door, a knock-out device for moving the circuit breaker trip lever for opening the circuit breaker under emergency operating conditions, an improved self-lapping brake valve device, a foot pedal for actuating the brake valve device, separate hand and foot operated pilot valve devices for controlling dead man's emergency operation of the brakes, an automatically operated sanding valve device for controlling the supply of fluid under pressure to the sand box and to the knockout device and means for controlling the operation of the brake valve device from the end of the car opposite that containing the pilot valve device.

The brake valve device is provided with an improved emergency piston device for effecting an emergency application of the brakes, sanding of the rails, opening of the circuit breaker controlling the electric current supplied to the motor for the vehicle and balancing the pressure of fluid acting on the door engine pistons, and which is subject to fluid pressure maintained in a safety control pipe, the fluid pressure in which is controlled by separate hand and foot operated pilot valve devices and which are so interlocked that either one or the other of the devices must be retained in depressed condition by the operator in order to maintain the pressure in the safety control pipe. Release of pressure from the hand operated lever and the foot operated lever at the same time vents the fluid from the safety control pipe to atmosphere and effects an emergency application of the brakes, sanding of the rails, tripping of the circuit breaker to open position and balancing of the fluid pressure acting on the door engines for permitting manual operation thereof.

Improved interlocking means is provided in the emergency piston device for preventing movement of the emergency piston to emergency application position upon release of pressure from both the hand operated lever and the foot operated pedal in the event that the operator has first moved the brake valve device to service application position wherein fluid under pressure is supplied from the main reservoir to the brake cylinder at a pressure of approximately 25 pounds. This feature enables concurrent removal of the operator's hand and foot from the pilot valve devices while the car is at rest so that he may perform other duties at a point remote from the controlling valve devices. Means are provided for preventing release of the brakes until the operator has depressed either the hand operated lever or the foot operated pedal and has restored sufficient pressure in the emergency piston chamber to force the emergency piston to its release position.

Means are provided for the operation of the brake valve device from the end of the car opposite to that on which the foot pedal is mounted.

From the foregoing it is apparent that the improved brake controlling apparatus is flexible in operation and insures the operation of the control devices in proper sequence.

Other safety car equipments, similar to that described herein, are shown and claimed in my copending application, Serial No. 698,242, filed on the same day as is this application, and in the copending application of Ellis E. Hewitt, Serial No. 698,231, filed on the same day as is this application, and Serial No. 19,378, filed May 2, 1935, all of which are assigned to the assignee of this application.

While but one embodiment of the invention is herein disclosed, it is obvious that omissions, additions and other changes may be made in the construction without departing from the spirit of the invention.

Having now described my invention, what I claim as new and desire to secure by Letters Patent, is:

1. In a fluid pressure brake, the combination of a brake valve device manually operable to effect an application of the brakes, fluid pressure responsive means normally subject to fluid under pressure and operated upon a reduction in the pressure of the fluid for also effecting the operation of the valve device to effect application of the brakes, and a pair of manually operative cooperating valve means which are effective, upon operation of either one or both out of a certain position thereof, to cause fluid under pressure to be supplied to the fluid pressure responsive means and which are effective, only when both are in the certain position thereof, to cause reduction in the pressure of fluid to which the fluid pressure responsive means is subjected.

2. In a fluid pressure brake, the combination of a brake valve device manually operable to effect an application of the brakes, fluid pressure responsive means normally subject to fluid under pressure and operated upon a reduction in the pressure of the fluid for also effecting the operation of the valve device to effect application of the brakes, a pair of manually operative cooperating valve means which are effective, upon operation of either one or both out of a certain position thereof, to cause fluid under pressure to be supplied to the fluid pressure responsive means and which are effective, only when both are in the certain position thereof, to cause reduction in the pressure of fluid to which the fluid pressure responsive means is subjected, and means effective, when the said brake valve device is manually operated to effect an application of the brakes, to prevent operation of the fluid pressure responsive means by a reduction in the pressure of fluid to which the fluid pressure responsive means is subjected.

3. In a fluid pressure brake, the combination with a brake valve device manually operable to effect an application of the brakes, of fluid pressure responsive means operated upon a reduction in fluid pressure for also effecting the operation of said brake valve device, a pair of manually operated interconnected valve means adapted when either or both are manually operated to supply fluid under pressure to said pressure responsive means and upon concurrent release of said interconnected valve means to effect reduction in pressure on said fluid pressure responsive means, means operative upon manually operating said brake valve device to effect an application of the brakes for preventing the operation of said fluid pressure responsive means by a reduction in fluid pressure, and a manually operable valve device for supplying fluid under pressure to said fluid pressure responsive means independently of said interconnected valve devices.

4. In a fluid pressure brake, the combination with a brake valve device manually operable to effect an application of the brakes, of fluid pressure responsive means operated upon a reduction in fluid pressure for also effecting the operation of said brake valve device, a pair of manually operated interconnected valve means adapted when either or both are manually operated to supply fluid under pressure to said pressure responsive means and upon concurrent release of said interconnected valve means to effect reduction in pressure on said fluid pressure responsive means, and means operative upon manually operating said brake valve device to effect an application of the brakes for preventing the operation of said fluid pressure responsive means by a reduction in fluid pressure and for preventing release of the brake valve device so long as the fluid pressure acting on said fluid pressure responsive device is reduced.

5. In a fluid pressure brake, the combination with a brake valve device manually operable to effect an application of the brakes, of fluid pressure responsive means operated upon a reduction in fluid pressure for also effecting the operation of said brake valve device, a pair of manually operated interconnected valve means adapted when either or both are manually operated to supply fluid under pressure to said pressure responsive means and upon concurrent release of said interconnected valve means to effect reduction in pressure on said fluid pressure responsive means, means operative upon manually operating said brake valve device to effect an application of the brakes for preventing the operation of said fluid pressure responsive means by a reduction in fluid pressure and for preventing release of the brake valve device so long as the fluid pressure acting on said fluid pressure responsive device is reduced, and a manually operable valve device for supplying fluid under pressure to said fluid pressure responsive means independently of said interconnected valve devices.

6. In a fluid pressure brake, the combination with a brake valve device operable to effect an application of the brakes, of fluid pressure responsive means operated by a variation in fluid pressure for operating said brake valve device to effect an application of the brakes, a reservoir normally charged with fluid under pressure, a fluid pressure operated circuit breaker device, a fluid pressure operated sanding device, a valve device operated by fluid under pressure for supplying fluid under pressure from said reservoir to said circuit breaker device and said sanding device, and valve means operated by said fluid pressure responsive means for supplying fluid under pressure for operating said valve device.

7. In a fluid pressure brake, the combination with a brake valve device operable to effect an application of the brakes, of fluid pressure responsive means operated by a variation in fluid pressure for operating said brake valve device to effect an application of the brakes, a reservoir normally charged with fluid under pressure, a fluid pressure operated circuit breaker device, a fluid pressure operated sanding device, a valve device operated by fluid under pressure for supplying fluid under pressure from said reservoir to said circuit breaker device and said sanding device, and valve means operated by said fluid pressure responsive means for supplying fluid under pressure for operating said valve device, the said circuit breaker device being adapted upon operation thereof to effect the venting of fluid under pressure from said reservoir to the atmosphere.

8. In a safety car control equipment, the combination of a brake valve device manually operative to effect an application of the brakes, a fluid pressure controlled means for also operating the brake valve device to effect application of the brakes, a reservoir normally charged with fluid under pressure, a door engine normally held in door-closing position by fluid under pressure supplied from said reservoir and adapted to be manually operated upon release of fluid pressure acting on said door engine, power circuit controlling means operated by fluid under pressure for opening the power circuit and adapted, upon movement to open the power circuit, to vent fluid under pressure supplied to operate same, and valve means operated upon the operation of said fluid pressure controlled means to cause the brake valve device to effect an application of the brakes, to supply fluid under pressure from said reservoir to said power circuit controlling means.

9. In a safety car control equipment, the combination of a reservoir normally charged with fluid under pressure, a door engine subject to the pressure of the fluid in said reservoir and normally held thereby in door-closing position to prevent manual opening of the door, said door engine being rendered ineffective to prevent manual opening of the door upon a reduction in the pressure of the fluid acting thereon, a fluid pressure operated valve device normally establishing a communication through which fluid under pressure is supplied to charge the said reservoir and operated by an increase in fluid pressure acting thereon to close said communication and establish a different communication through which fluid under pressure is supplied from said reservoir to effect sanding of the rails, power circuit controlling means operated by the pressure of fluid supplied to sand the rails for opening the power circuit, a valve effective, upon operation of the power circuit controlling means to open the power circuit, to vent fluid under pressure supplied from the said reservoir to effect operation of the power circuit controlling means and thereby to so reduce the reservoir pressure as to render the door engine ineffective to prevent manual opening of the door, and a fluid pressure operated valve means normally subject to fluid under pressure and operative upon a reduction in the pressure of the fluid for effecting an application of the brakes and for establishing a communication through which fluid under pressure is supplied to operate the said valve device.

10. In a safety car control equipment, the combination with a brake valve device operable to effect an application of the brakes, of a fluid pressure responsive device operable upon a reduction in fluid pressure for effecting the operation of said brake valve device to cause an application of the brakes, a reservoir, a valve device for normally supplying fluid under pressure to said reservoir and operated by fluid pressure for supplying fluid under pressure from said reservoir to effect the sanding of the rails, and means operated upon movement of said fluid pressure responsive device to effect the operation of said brake valve device for supplying fluid under pressure to said sanding controlling valve device.

11. In a fluid pressure brake equipment for a vehicle, the combination with a brake valve device manually movable to application position, biasing means for also moving said brake valve device to application position, fluid pressure controlled means for rendering said biasing means normally ineffective, a fluid pressure actuated sanding device, a source of fluid supply for said sanding device, and a valve means actuated by said biasing means for controlling the supply of fluid under pressure from said source to said sanding device.

12. In a fluid pressure brake equipment for a vehicle, the combination with a brake valve device manually movable to effect an application of the brakes, of automatically operated means for moving said brake valve device to effect an application of the brakes, a source of limited fluid supply, a fluid pressure actuated power circuit controlling device for the vehicle adapted to be operated by fluid supplied thereto from said source, valve means actuated as a result of the operation of said automatically operated means for controlling the limited supply of fluid from said source to said power circuit controlling device, and valve means controlled by movement of said power circuit controlling device for exhausting said limited supply of fluid.

13. In a fluid pressure brake equipment for a vehicle, the combination with a brake valve device manually movable to effect an application of the brakes, of automatically operated means for moving said brake valve device to effect an application of the brakes, a source of limited fluid supply, a fluid pressure actuated means for sanding the rails adapted to be operated so long as fluid under pressure is supplied thereto from said source, means actuated as a result of the operation of said automatically operated means for controlling the limited supply of fluid under pressure from said source to said sanding means, a power circuit controlling means actuated by fluid supplied from said source of supply, and valve means controlled by said power circuit controlling means for exhausting said limited supply of fluid.

14. In a fluid pressure brake equipment for a vehicle, the combination with a brake valve device manually movable to effect an application of the brakes, of automatically operated means for moving said brake valve device to effect an application of the brakes, a source of limited fluid supply, a fluid pressure actuated door engine device operating on fluid under pressure supplied from said source and adapted to be manually operable when the pressure of the fluid acting thereon is reduced, a power circuit controlling device actuated by fluid under pressure from said source of supply, a valve means controlled by said automatically operated means for controlling the supply of fluid under pressure from said source of supply to said power circuit controlling device, and valve means controlled by the said power circuit controlling device for exhausting said limited supply of fluid for reducing the pressure of fluid acting on said door engine device so as to render it manually operable.

15. In a fluid pressure brake, the combination with a brake valve device movable to an application position and a release position, of a fluid pressure actuated means normally subject to fluid under pressure in the release position thereof, said fluid pressure actuated means being adapted, upon a reduction in pressure acting thereon, to move to application position for effecting movement of the brake valve device to application position, and a manually operable valve means for controlling the supply of fluid under pressure to said fluid pressure actuated means and movable by pressure applied by an operator to a fluid supply position for supplying fluid under pressure to said fluid pressure actuated means and movable when the operator relieves said valve means of pressure to an application position for effecting a reduction in the pressure acting on said fluid pressure actuated device for effecting actuation thereof for moving the brake valve device to application position.

16. In a fluid pressure brake, the combination with a brake valve device having an application position, a manually actuated means for moving the brake valve device to effect an application of the brakes, yielding means for moving the brake valve device to application position for effecting an application of the brakes, fluid pressure actuated means for holding the yielding means inoperative for moving the brake valve device, a manually operable valve means for controlling the supply of fluid to said fluid pressure actuated means, and means actuated by the said manually actuated means for rendering the said yielding means inoperative to effect movement of the brake valve device to application position.

17. In a safety car control equipment, the combination with a fluid pressure brake system including a brake valve device movable to application position for effecting an application of the brakes, of a fluid pressure responsive device operable upon a variation in fluid pressure acting thereon for effecting movement of the brake valve device to application position, a fluid supply reservoir, a discharge conduit, a fluid pressure actuated valve device adapted when in one position to supply fluid under pressure to the supply reservoir and when in another position to cut off the supply of fluid to the reservoir and to open communication from the reservoir to said discharge conduit, a fluid actuated sand box connected to said conduit through which fluid under pressure is exhausted from said reservoir for effecting a discharge of sand, and a valve device operated by said fluid pressure responsive device when the latter is moved to application position to supply actuating fluid to said fluid pressure actuated valve device to move said valve device to its second said position.

18. In a fluid pressure brake equipment for a vehicle, the combination with a brake valve device manually movable to effect an application of the brakes, of automatically operated means for moving said brake valve device to effect an application of the brakes, a source of limited fluid supply, a fluid pressure actuated door engine device for the vehicle having a movable abutment normally subjected on one side to fluid under pressure supplied from said source for moving said abutment to one operative position, and adapted to be subjected on the opposite side to fluid under pressure also supplied from said source for moving said abutment to another operative position, the said abutment being movable manually when the fluid pressure acting on said abutment is reduced, a fluid pressure actuated power circuit controlling device, a valve means actuated as a result of the operation of said automatically operated means for controlling the supply of fluid from said source to said power circuit controlling device, and valve means in the said power circuit controlling device for venting the fluid supplied thereto from said source so that the pressure of fluid from said source is reduced for reducing the pressure of the fluid acting on said abutment for rendering said abutment manually operable.

DAVID W. LLOYD.

CERTIFICATE OF CORRECTION.

Patent No. 2,071,752. February 23, 1937.

DAVID W. LLOYD.

It is hereby certified that the above numbered patent was erroneously issued to the inventor said "Lloyd" whereas said patent should have been issued to The Westinghouse Air Brake Company, of Wilmerding, Pennsylvania, a corporation of Pennsylvania, as assignee of the entire interest in said invention, as shown by the records of assignments in this office; and that the said Letters Patent should be read with this correction therein that the same may conform to the record of the case in the Patent Office.

Signed and sealed this 6th day of April, A. D. 1937.

(Seal)

Henry Van Arsdale
Acting Commissioner of Patents.